M. DAVIS.
THRESHING MACHINE.
APPLICATION FILED FEB. 18, 1915.
1,174,398.
Patented Mar. 7, 1916.
4 SHEETS—SHEET 2.
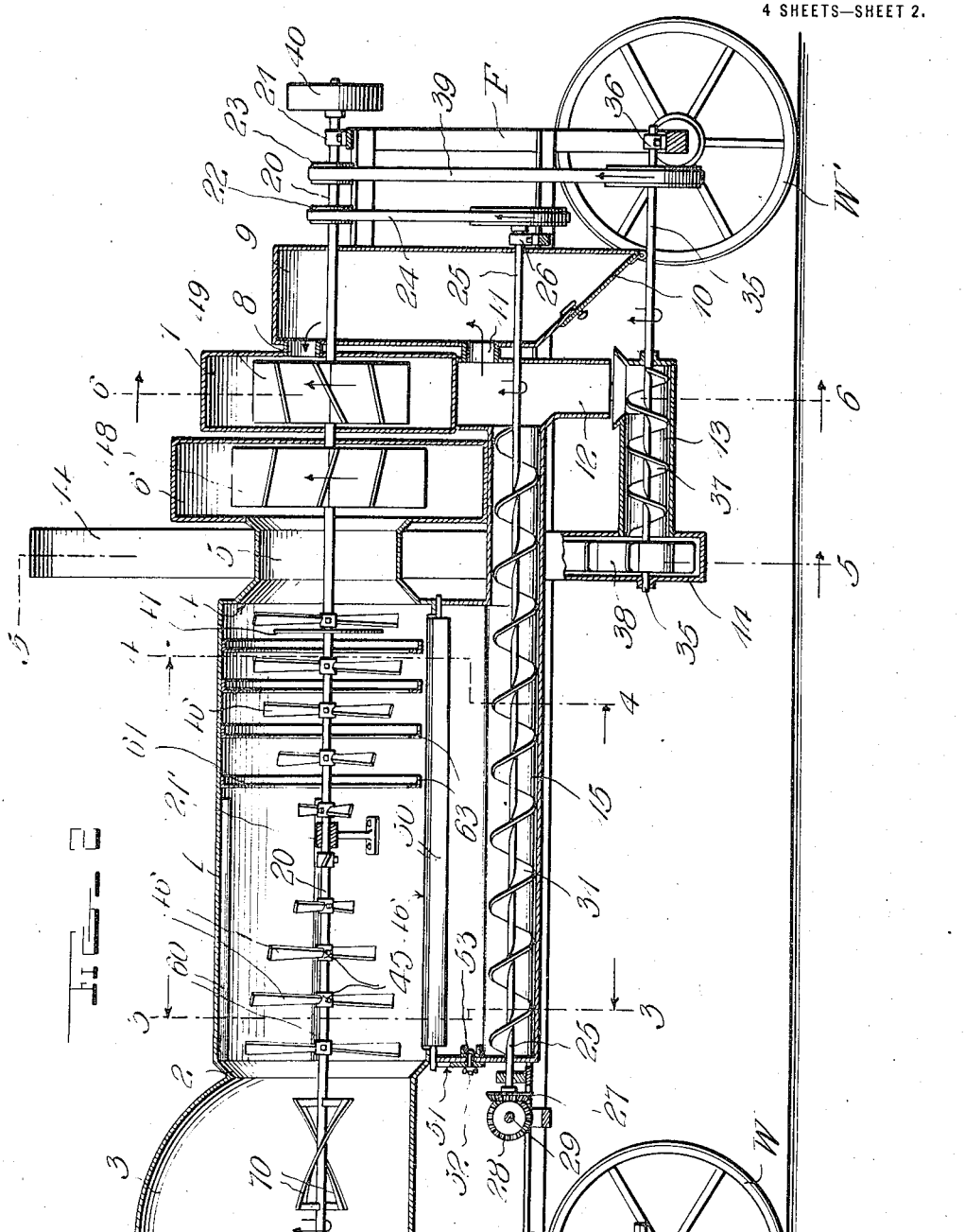
Witnesses
C. Clement
H. Woodard
Inventor
Monroe Davis
By H. B. Willson & Co.
Attorneys

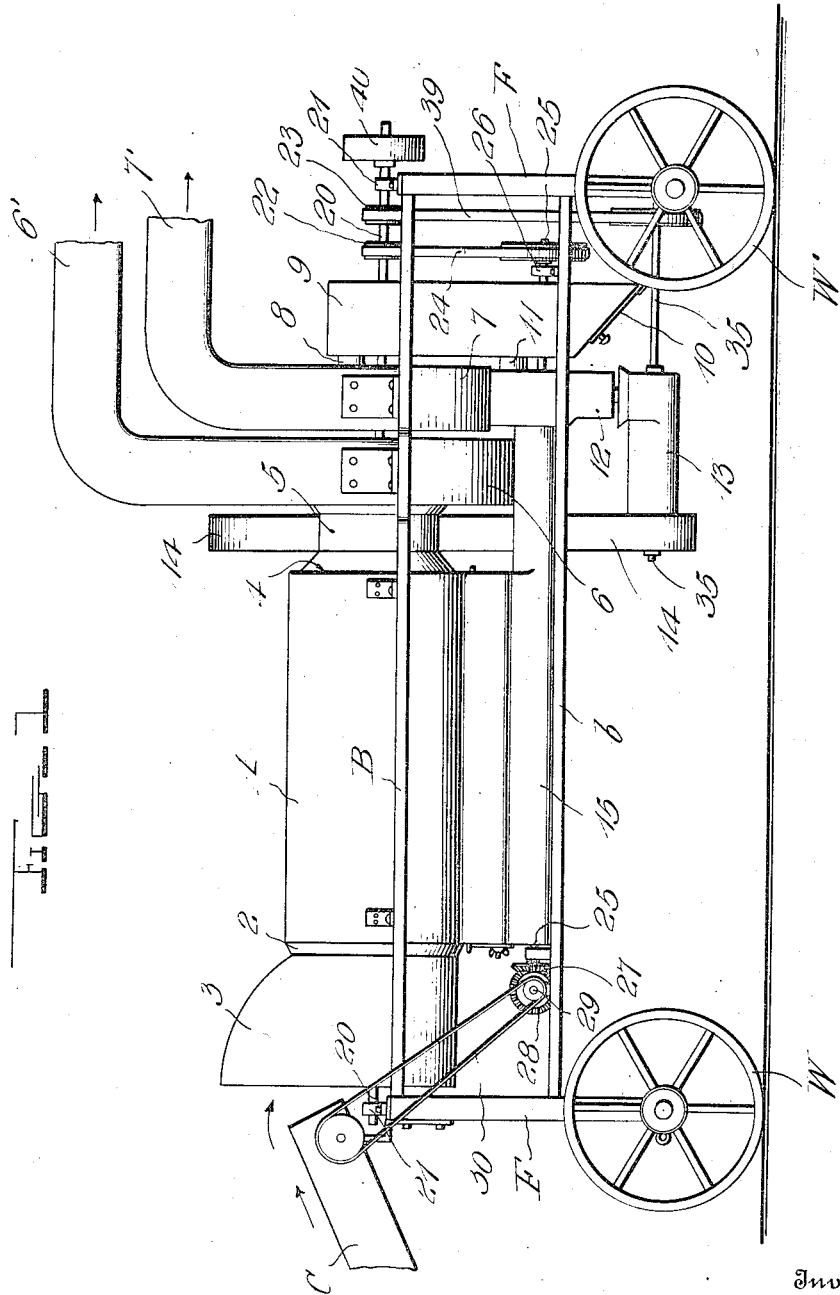

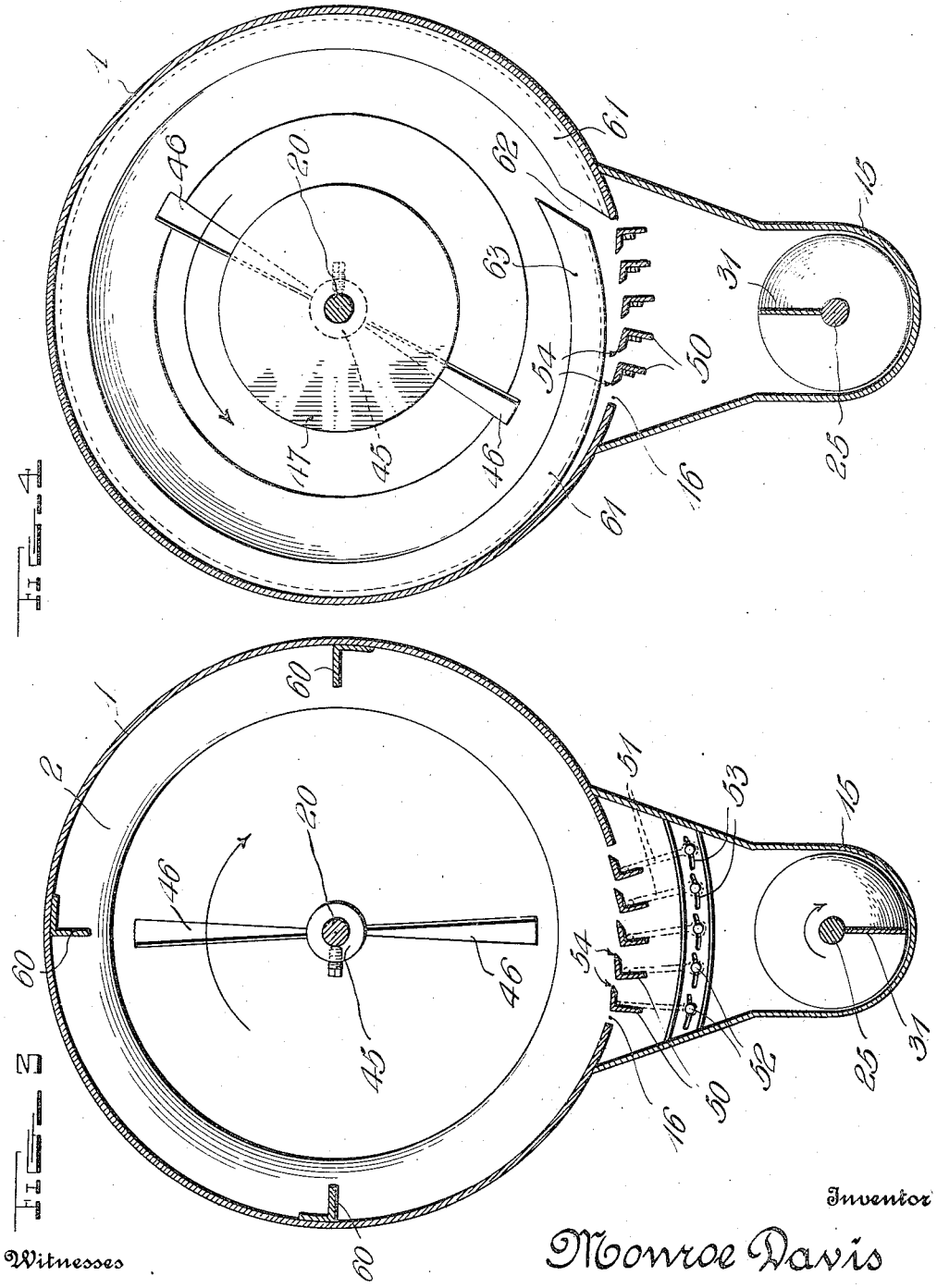

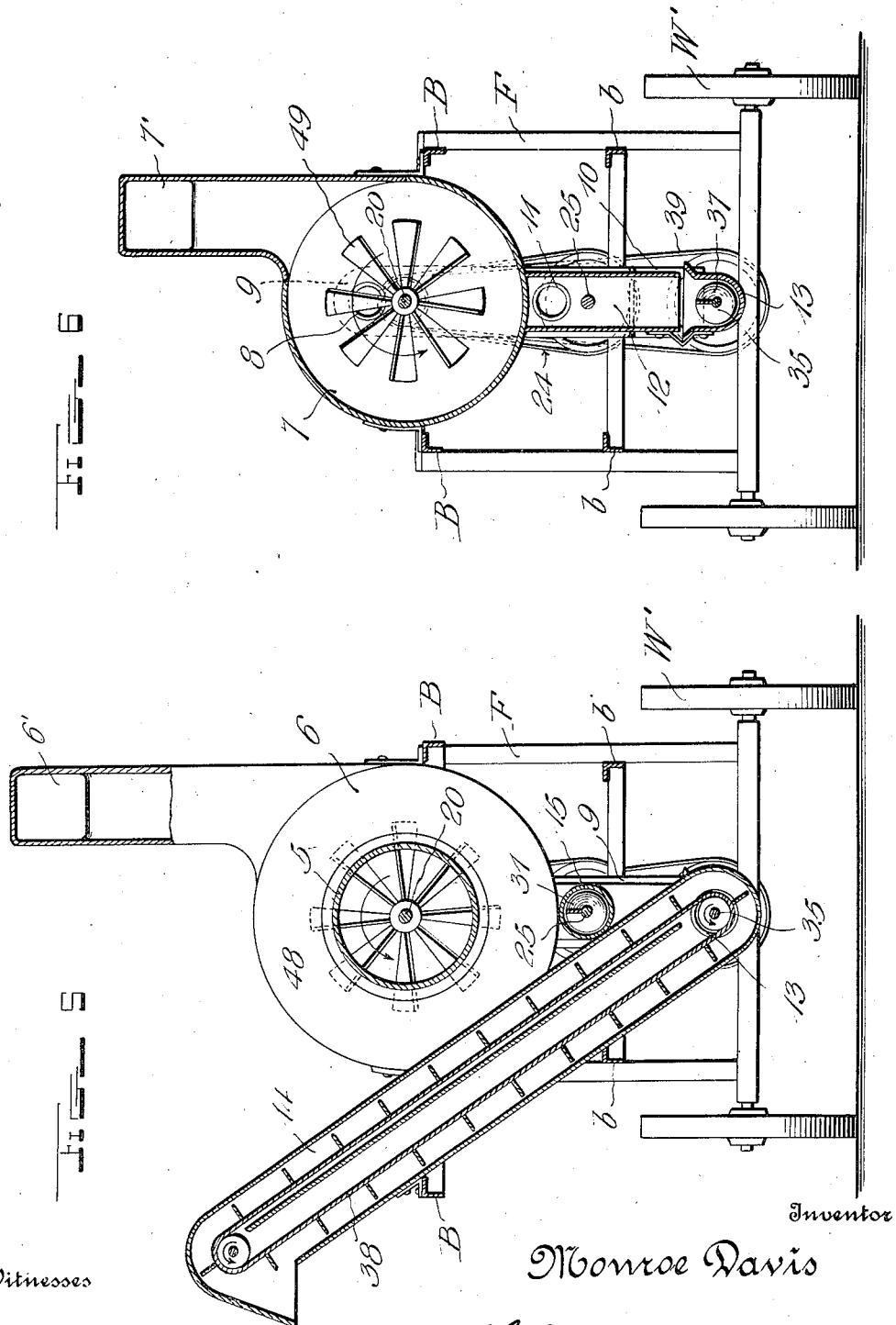

UNITED STATES PATENT OFFICE.

MONROE DAVIS, OF ENID, OKLAHOMA, ASSIGNOR OF TWO-NINTHS TO ALMOND L. WEST, TWO-NINTHS TO THOMAS E. FORSTER, AND ONE-TWELFTH TO GEORGE D. WILSON, ALL OF ENID, OKLAHOMA, AND TWO-NINTHS TO JOSEPH T. HINDS, OF DILL CITY, OKLAHOMA.

THRESHING-MACHINE.

1,174,398.   Specification of Letters Patent.   Patented Mar. 7, 1916.

Application filed February 18, 1915. Serial No. 9,106.

*To all whom it may concern:*

Be it known that I, MONROE DAVIS, a citizen of the United States, residing at Enid, in the county of Garfield and State of Oklahoma, have invented certain new and useful Improvements in Threshing-Machines; and I do declare the following to be a full, clear, and exact description of the invention, such as will enable others skilled in the art to which it appertains to make and use the same.

My invention relates to improvements in threshing machines and has for its object to improve upon the general design and construction of machines of this class to the extent hereinafter described and claimed and shown in the drawings wherein:—

Figure 1 is a side elevation of a threshing machine constructed in accordance with my invention; Fig. 2 is a central vertical longitudinal section thereof; Figs. 3, 4, 5 and 6 are vertical transverse sections as seen along the planes of the lines 3—3, 4—4, 5—5 and 6—6 of Fig. 2.

In these drawings, constituting a part of this application, a main frame F is shown which is supported upon front and rear wheels W and W', the former being preferably so mounted as to allow them to swing laterally. The frame F includes a pair of longitudinal angle iron bars B which are disposed at the top thereof and another pair of such bars $b$ which are located near the bottom of the frame.

Supported in any suitable manner upon the bars B, near the front ends thereof, is a cylindrical threshing chamber 1, this chamber being of equal diameter throughout the active portion of its length but being reduced slightly at 2, near its forward end, and being then enlarged upwardly as seen at 3 to provide for the reception of the bundles of grain which may be fed thereto by any appropriate type of conveyer C. This conveyer is here shown of the endless belt type, but it will be evident that it might well be of the pneumatic type or in some instances, both forms of conveyers may be employed. Since the construction of the conveyer forms no part of the present invention, however, the preceding description and illustration are thought to be sufficient.

The rear end of the threshing chamber 1 is provided with an internal annular shoulder 4, this shoulder being adapted to retard threshed grain to prevent it from being discharged with the straw, and having its inner edge joined in any suitable manner to a reduced neck 5 which continues rearwardly therefrom and communicates with the interior of an exhaust fan casing 6, which casing is disposed in longitudinal alinement with the chamber 1 and with a second fan casing 7 which is located in rear of said casing 6.

The casing 7 communicates by the provision of a tube 8 or other appropriate conduit, with what may well be termed a vacuum box 9 which stands upright within the framework and whose lower end is preferably inclined and provided with a normally closed door 10. Said lower end of the vacuum box 9 communicates at 11 with a chamber 12 disposed directly beneath the fan casing 7, this chamber being adapted to receive the threshed grain and to deposit the same in a horizontal trough 13 which discharges into an inclined conveyer housing or tube 14.

It may be well to here explain that the chamber 12 receives the threshed grain from a conveying trough 15 which underlies a longitudinal outlet slot 16 with which the lower side of the threshing chamber 1 is provided.

For the purpose of actuating all parts of the machine, a main longitudinal shaft 20 is provided, this shaft being mounted in bearings 21 on the end portions of the frame F and in one or more bearings 21' which may be secured to the chamber 1 in any appropriate manner. This shaft extends centrally through said chamber, the neck 5 thereof, and through the two fan casings 6 and 7, said shaft also extending through the upper end of the vacuum box 9. Directly in rear of this box 9, the shaft 20 is provided with two pulleys 22 and 23, the former actuating a belt 24 to drive a countershaft 25 whose rear end is revolubly mounted as seen at 26 in an appropriate bearing, while its forward end projects through the front end of the trough 15 and carries a bevel gear 27 which in turn meshes with a second bevel gear 28 keyed to the transverse shaft 29. It is from this shaft 29 that the conveyer C is preferably driven, a belt 30 being shown in the present instance for this purpose.

It will be noted that the intermediate portion of the shaft 25 lies substantially centrally within the trough 15 and that it is here equipped with a helical conveying web 31, this conveyer actuating to move the contents of the trough 15 rearwardly into the chamber 12 from which they will be deposited into the trough 13. Extending longitudinally through and located centrally within this trough 13 is a second countershaft 35 whose rear end is revolubly mounted in a bearing 36 which may well be carried by the rear axle of the machine while its forward end projects through and is revolubly mounted in a bearing carried by the front wall of the conveyer housing 14. The intermediate portion of the shaft 35 is provided with a helical conveying web 37 for moving the grain deposited in the trough 13 into the lower end of the housing 14, in which housing, such grain is then elevated by an endless conveyer 38 which is here shown as driven by the forward end of the shaft 35, this shaft being in turn driven by a belt 39 which passes around a pulley thereon and around the pulley 23 on the main drive shaft 20. This main drive shaft may be driven in any appropriate manner but is here shown as equipped with a pulley 40 whereby an appropriate driving belt may be applied.

Adjustably secured to the shaft 20, by any appropriate means, are the hubs 45 of a plurality of pairs of diametrically alined radial arms 46, the positions of the arms of these pairs being gradually shifted on a spiral course from one end of the chamber 1 to the other end thereof. It is evident from the drawings that the hubs 45 are spaced longitudinally on the shaft 20 and that the endmost of the pairs 46 are located only slight distances from the end walls of said chamber, the various arms of the pairs 46 being shown (as they preferably are) in the form of fan blades or arms, this being expedient for a purpose to be more clearly set forth.

In addition to the various groups of radial arms, the shaft 20 is equipped with a grain retarding disk 47 which is located directly in front of the rearmost group, this disk being disposed contiguous to the annular shoulder 4 and being therefore substantially in the outlet or neck 5. The portion of the shaft continuing rearwardly from the chamber 1 is equipped with a suction fan 48 disposed in the exhaust casing or box 6, and a second suction fan 49 located in the casing 7 and operating across the front end of the tube 9, this last-named fan being so pitched as to create suction or a partial vacuum within the vacuum box 9, while the fan 48 is pitched in the opposite direction to create a comparatively strong suction through the entire chamber 1.

Hereinbefore, I have mentioned an outlet slot 16 with which the lower side of the chamber 1 is provided. In the present application, this slot is shown as partially closed by a plurality of longitudinal parallel angle iron bars 50 whose opposite ends are revolubly mounted to allow them to tilt to the extent seen in Fig. 3 or to a greater or less amount. In order to lock these bars 50 in their adjusted positions, they are equipped with crank arms 51 through whose lower ends adjusting bolts 52 pass, these bolts being here shown as projecting through slots 53 in the front end wall of the trough 15 and as provided with thumb nuts whereby they may be readily tightened and loosened. When the bars in question are disposed to active position, their horizontal flanges are adapted to be disposed tangentially to the curved wall of the chamber 1, whereby any grain being carried around by the various arms 46, will be caught by these flanges and conveyed into the trough 15. In order to facilitate such action of the bars on the grain, the edges of their horizontal flanges are preferably sharpened as seen at 54.

Lying parallel to the bars 50 but being spaced considerable distances therefrom, is a plurality of longitudinal angle iron bars 60 which are secured to the inner side wall of the chamber 1 and which terminate at approximately the center of said chamber, the rear end of the latter being occupied by a plurality of angle iron ring-shaped elements 61 which are disposed transversely therein and whose lower sides are split as most clearly seen at 62 in Fig. 4. As likewise seen in this figure, one end of each of the elements 61 is deflected inwardly. By this construction, what may well be termed cam fingers 63 are provided, these fingers acting to move the contents of the chamber 1 gradually inward away from the opening 16, thus allowing the threshed grain to readily be discharged through said opening but preventing any straw from being discharged. Furthermore, when the mass being rotated by the radial arms 46 reaches the ends of the fingers 63, it will suddenly move outwardly, whereby it is jarred. This jarring facilitates the separation of the grain from the straw in a manner to be hereinafter referred to.

When the bundles of unthreshed grain are being fed into the chamber 1 or rather into the enlarged front end 3 thereof, it becomes necessary to provide some means for cutting the bands on such bundles. It likewise becomes highly expedient to so construct this cutting means as to cause it to assist in feeding the unthreshed grain into the threshing chamber 1. To accomplish this result, I have provided a plurality of combined helical conveyers and cutting knives, these members being carried by the front end of the shaft 20 and being designated by the numeral 70. The outer edges of these members are sharpened whereby the bands on the bundles will be readily cut, and the blades are so pitched as to cause them to act as helical conveyers, thus moving the mass of unthreshed grain inwardly into the chamber 1. Upon entering this chamber, the grain is caught by the various radial arms 46 which are now rotating at a high speed and these arms tend, by centrifugal force, to throw such unthreshed grain outwardly and to beat it against the bars 60, thus serving to partially separate the grain from the straw, the threshed grain then falling through the front end of the outlet 16 and into the trough 15. It will be understood that while this operation is taking place, the various fan arms 46 as well as the main suction fan 48 are creating a strong blast through the chamber 1 and that said blast or suction will draw the grain being threshed rearwardly through the cylinder. Due, however, to the fact that the arms 46 are set spirally on the shaft, the mass of straw is prevented from being suddenly drawn through the chamber but is violently whirled by said arms as it travels on its spiral course. As the contents of the chamber 1 now move toward the rear end thereof, and as the straw becomes finer (due to the action of the various rotating parts thereon), its movement is retarded to a slight extent by the elements 61 and this straw is positively prevented from being discharged through the rear end of the outlet slot 16, by the provision of the inturned ends of the cams 63, it being remembered that these cams move the mass inwardly away from the opening, thus effectually allowing the threshed grain to be discharged. When the straw has reached the extreme rear end of the chamber 1, the disk 47 is encountered which disk then checks the movement thereof and causes it to be rotated more violently than before, thus insuring that all grain is separated therefrom before it is discharged into the casing 6, it being evident that threshed grain cannot pass the shoulder 4 to be discharged with said straw. From said casing 6, the straw is then blown to the stack through the pipe 6'. In addition to the above set forth function of the disk 47, it serves to prevent direct passage of air through the center of the chamber 1 and thus causes the air adjacent the wall of said chamber to be stirred by the fan 48. Were it not for this disk, a void would be caused adjacent the aforesaid wall and chaff and the like would thus be allowed to discharge with the threshed grain.

During the separating operation, when the threshed grain falls into the trough 15 and is conveyed therefrom into the chamber 12, considerable chaff will have traveled with such grain. The fan 49 and the vacuum box 9 now come into action, the fan 49 creating suction within said box and within the chamber 12 and thus drawing all of this chaff into the fan casing 7 from which it is discharged through an appropriate outlet 7'. The cleaned grain now falls from the chamber 12 into the trough 13 and is moved therein by the conveyer 37 into the lower end of the housing 14, the conveyer 38 in this housing, then lifting the grain and discharging it into appropriate receptacles (not shown) placed beneath the discharge end of said housing.

From the foregoing description, taken in connection with the accompanying drawings, it will be seen that a very simple machine has been provided for accomplishing the desired results, and that such machine will be highly efficient in operation and may be more readily transported from place to place than the usual type of thresher.

Although considerable emphasis is laid upon all of the structure shown in the drawings and above described, the most novel features thereof are set forth in the following.

I claim:—

1. A threshing machine comprising a threshing chamber, a shaft extending longitudinally therethrough and having a beater disposed therein, and a knife and feeder secured to said shaft, in combination with an unthreshed grain inlet adjacent said knife and feeder, and threshed grain and straw outlets.

2. A threshing machine comprising a threshing chamber having at one end an inlet neck, a shaft extending longitudinally through said chamber and having a beater disposed therein, and a combined helical feeder and band cutting knife carried by said shaft and disposed in the neck, in combination with threshed grain and straw outlets.

3. A threshing machine comprising a threshing chamber, a shaft passing longitudinally therethrough and having a straw engaging member, and a split ring-shaped element disposed in said chamber and having one of its ends deflected inwardly, combined with an unthreshed grain inlet and threshed grain and straw outlets.

4. A threshing machine comprising a threshing chamber, a shaft passing longitudinally therethrough and having a straw engaging member, and a plurality of transversely disposed longitudinally spaced split ring-shaped elements in said chamber and each having one of its ends deflected inwardly, combined with an unthreshed grain inlet and threshed grain and straw outlets.

5. A threshing machine comprising a threshing chamber, a shaft passing longitudinally therethrough and having a straw engaging member, and a substantially split ring-shaped element disposed in said chamber and having one end deflected inwardly, combined with a threshed grain outlet disposed outwardly from said inturned end, an unthreshed grain inlet and a straw outlet.

6. The combination with a non-rotatable threshing chamber, means therein for moving a body of unthreshed grain swiftly around a circular course in contact with the curved wall of the chamber, and a threshed grain outlet in said wall, of means to move the straw inwardly away from said threshed grain outlet.

7. The combination with a threshing chamber, means therein to throw the unthreshed grain outwardly against its curved wall, and a threshed grain outlet in said wall, of a finger extending across the threshed grain outlet and directed inwardly tangentially in respect to the aforesaid wall to deflect the straw inwardly away from said threshed grain outlet.

8. The combination with a non-rotatable threshing chamber, means therein to throw the unthreshed grain outwardly against its curved wall, and a threshed grain outlet in said wall, of means to deflect the straw inwardly away from the outlet, and additional means disposed in said outlet to deflect the threshed grain outwardly therethrough.

9. The combination with a threshing chamber, means therein to throw the unthreshed grain outwardly against its curved wall, and a threshed grain outlet in said wall, of means to deflect the straw inwardly away from the outlet, and a plurality of longitudinal bars in said outlet and disposed tangentially to the curved wall of the cylinder.

10. The combination with a threshing chamber and means therein to throw the grain being threshed outwardly, of arcuate fingers disposed at intervals in the chamber and adapted to move said grain gradually inward and then to suddenly release the same.

11. The combination with a threshing chamber and means therein to throw the grain being threshed outwardly, of a straw outlet at one end of the chamber, and a rotating disk disposed substantially within said outlet.

12. A threshing machine including a threshing chamber having one end enlarged upwardly to provide an unthreshed grain inlet, its other end being provided with an outlet, in combination with a longitudinal shaft in the cylinder, threshing means on said shaft, and a spiral cutter likewise carried by said shaft and disposed in said inlet.

13. A threshing machine comprising a threshing chamber, an exhaust fan casing communicating therewith, a second fan casing and a vacuum box disposed in longitudinal alinement with the threshing chamber, the vacuum box being in communication with the second fan casing, and a chamber with which said vacuum box communicates and into which threshed grain is discharged, in combination with a longitudinal shaft extending through the threshing chamber and the two fan casings, fans on said shaft and disposed in said casings, and threshing means on said shaft and disposed in the threshing chamber.

In testimony whereof I have hereunto set my hand in presence of two subscribing witnesses.

MONROE DAVIS.

Witnesses:
CHAS. ROBERTSON,
F. D. OWENS.

Copies of this patent may be obtained for five cents each, by addressing the "Commissioner of Patents, Washington, D. C."